Patented Oct. 6, 1942

2,297,769

UNITED STATES PATENT OFFICE 2,297,769

HYDROGENATION OF ALKYL ARYL KETONES

Vladimir N. Ipatieff and Vladimir Haensel, Chicago, Ill., assignors to Universal Oil Products Company, Chicago, Ill., a corporation of Delaware No Drawing. Application August 22, 1941,
Serial No. 407,908

10 Claims. (Cl. 260—668)

This invention relates to the use of particular catalytic materials in reactions involving hydrogenation of alkyl aryl ketones.

In one specific embodiment the present invention comprises a process for producing alkylated aromatic hydrocarbons by subjecting an alkyl phenyl ketone and hydrogen to contact with a composite comprising essentially a major proportion of reduced copper and a relatively minor proportion of alumina.

A composite of the indicated materials utilized as catalyst for hydrogenating alkyl aryl ketones in accordance with the present invention, may be made by the general procedure of co-precipitating basic copper carbonate and aluminum hydroxide. The precipitation may be carried out either at room temperature or at a higher temperature utilizing as precipitating agent ammonium carbonate, ammonia, or in some cases a carbonate or hydroxide of potassium or sodium. The precipitated material so obtained is filtered, washed with water to remove soluble salts, dried, formed into particles, and then reduced with hydrogen or a gas mixture containing hydrogen prior to use for converting alkyl phenyl ketones into alkylated benzene hydrocarbons.

The catalyst may also be prepared by precipitation in a number of different ways. Thus, coprecipitation may be carried out at room temperature followed by heating to approximately 80° to 90° C. or one component may be precipitated first, the other solution added to the reaction mixture, and the second component then precipitated upon the first precipitated material. The resulting precipitated mixtures are then dried, formed into particles, and reduced as hereinabove set forth.

Particles of reduced copper-alumina catalysts prepared as indicated, and frequently containing incompletely reduced copper oxide, are utilizable as fillers in suitable reactors through which the charged ketone and hydrogen are passed in the presence or absence of a suitable solvent at a temperature of from about 75° to about 250° C. under a pressure generally of from about 50 to about 200 atmospheres. As the operative conditions are not necessarily the same for the hydrogenation of different ketones the catalyst temperature, charging rate of alkyl aryl ketone, and ratio of hydrogen to ketone employed are chosen to give a high degree of conversion to alkylated aromatic hydrocarbons with a relatively small amount of accompanying decomposition. When desired, less severe conditions of hydrogenation may be employed in order to obtain alkyl phenyl carbinols which appear to be intermediate products in the hydrogenation of an alkyl aryl ketone to an alkylated aromatic hydrocarbon.

Such hydrogenation of alkyl phenyl ketones to alkylated aromatic hydrocarbons having paraffinic chains of from 1 to 20, or more, carbon atoms attached to a benzene ring is also effected in the presence of a powdered copper-alumina catalyst mixed therewith and passed through a suitable reactor operated under substantially the conditions of temperature and pressure hereinabove indicated for hydrogenation in the presence of a fixed bed catalyst. The reaction products formed in the presence of either a fixed catalyst or powdered catalyst are removed from the catalytic material and fractionated to separate desired products from unconverted charging stock and decomposition products. Said unconverted charging stock is recycled to further contact with hydrogen in the presence of the hydrogenating catalyst to form an additional quantity of desired alkylated aromatic hydrocarbon.

Batch type operation of an alkyl phenyl ketone may be carried out by subjecting said ketone and a copper-alumina catalyst to contact in an autoclave equipped with mechanical means of agitation and operated under the conditions of temperature and pressure hereinabove set forth. After the hydrogenation reaction proceeds for a time sufficient to convert the alkyl phenyl ketone into an alkylated aromatic hydrocarbon, the reaction products are separated from the catalyst and fractionally distilled to remove desired products from unconverted or incompletely converted material which is blended with an additional quantity of the ketone charged and returned to further hydrogenating treatment.

The process of this invention is particularly advantageous for producing aromatic hydrocarbons with long paraffinic side chains and alkyl aryl carbinols from alkyl aryl ketones and particularly from alkyl phenyl ketones. The process as described gives better yields of desired alkyl aromatic hydrocarbons and alkyl aryl carbinols than are obtainable by the well-known Clemmensen reaction which involves the reduction of an alkyl aryl ketone to an alkyl aryl carbinol by treating the ketone with amalgamated zinc and hydrochloric acid.

Hydrogenation catalysts prepared by precipitating copper carbonate with aluminum hydroxide followed by filtering, washing, drying, and reducing as hereinabove set forth, are generally hard and resistant to breakage, have a relatively high activity due to the porous character of the metal formed by the reduction of the carbonate, and, because of their high activity, do not undergo excessive carbonization during use in hydrogenation of alkyl phenyl ketones. When carbonization occurs, as after a long period of service, it is usually advisable to burn the carbonaceous deposits from the catalysts by treatment with a gas of controlled oxygen concentration followed by heating in a reducing gas such as hydrogen, carbon monoxide, mixtures of hydrogen and carbon monoxide, or gas mixtures containing a substantial amount of a reducing gas.

The following examples are given to indicate typical results obtainable in the operation of the process, although not with the intention of unduly limiting the generally broad scope of the invention:

EXAMPLE I

A number of catalysts were prepared of different compositions by dissolving appropriate amounts of hydrated cupric nitrate and hydrated aluminum nitrate in water and rapidly adding thereto with agitation an aqueous solution of ammonium carbonate. After reaching the endpoint, as indicated by intermediate tests, the precipitate was rapidly stirred and heated to 80° C. After cooling, the supernatant solution was decanted, the precipitate was washed with water, filtered, again washed with water, and then dried for 10 hours at a maximum temperature of 245° C. The dried precipitate was then cooled and heated in a stream of hydrogen at a temperature which was increased gradually to 225° C., maintained at that temperature for 1 hour, then cooled in a stream of hydrogen, and transferred to a container containing cyclohexane. The cyclohexane was so used to prevent oxidation of the reduced and highly pyrophoric catalyst which thus consisted of a paste-like mixture of catalyst and cyclohexane.

Five parts by weight of reduced catalyst prepared as above described, 50 parts by weight of acetophenone, and 40 parts by weight of cyclohexane solvent were charged to an autoclave, placed under 100 atmospheres initial hydrogen pressure, and heated rapidly to 115° C. The progress of hydrogenation was indicated by the rate of decrease in autoclave pressure which became constant when the hydrogenation was completed. After cooling of the autoclave, the reaction product was removed therefrom and distilled to determine the amounts of ethyl benzene and methyl phenyl carbinol produced. At 115° C. about 95% of the product was methyl phenyl carbinol. The following table gives the results of a number of runs on the hydrogenation of acetophenone in the presence of several catalysts containing from 50 to 100% of copper oxide and from 50 to 0% of alumina. The results given in the table show that pure copper did not catalyze the hydrogenation of acetophenone to methyl phenyl carbinol and ethyl benzene at temperatures up to 260° C. Hydrogenation was effected slowly, however, when the catalyst containing 1% of alumina and 99% of copper oxide; but catalysts of good activity were obtained by reducing precipitated mixtures containing from about 98 to about 93% by weight of copper oxide and from about 2 to about 7% by weight of alumina.

TABLE I

Hydrogenation of acetophenone in the presence of copper-alumina catalysts

| Composition of catalyst mixture before reduction | | Temperature at which hydrogenation began | Maximum pressure reached | Pressure drop | Minutes required for pressure to drop from maximum to constant | Minutes from starting to end of hydrogenation |
|---|---|---|---|---|---|---|
| Alumina | Copper oxide | | | | | |
| Percent | Percent | °C. | Atmospheres | Atms./minute | | |
| 0.0 | 100.0 | Above 260 | 164 | No hydrogenation | | |
| 1.0 | 99.0 | 91 | 116.5 | .67 | 43 | 52 |
| 5.0 | 95.0 | 91 | 115.5 | .83 | 26 | 30 |
| 5.55 | 94.45 | 90 | 115.0 | .75 | 27 | 30 |
| 5.55 | 94.45 | 98 | 116.0 | .67 | 30 | 39 |
| 6.67 | 93.33 | 87 | 115.5 | .75 | 29 | 40 |
| 10.52 | 89.48 | 89 | 115.0 | .63 | 36 | 44 |
| 14.3 | 85.7 | 84 | 115.0 | .67 | 37 | 46 |
| 33.3 | 66.7 | 101 | 118.0 | .50 | 69 | 77 |
| 50.0 | 50.0 | 90 | 115.0 | .50 | 42 | 48 |

EXAMPLE II

A copper-alumina mixture formed as indicated in Example I by reducing a composite comprising essentially 4% alumina and 96% copper oxide was used as catalyst for hydrogenating to the corresponding carbinols the series of alkyl phenyl ketones shown in Table II. In these runs on different ketones, 50 parts by weight of ketone was dissolved in 40 parts by weight of cyclohexane, the resulting solution and 5 parts by weight of catalyst were placed in an autoclave, hydrogen was introduced to 100 atmospheres pressure, and then the temperature of the charged autoclave was increased rapidly to 115° C. and maintained until hydrogenation to the corresponding alkyl phenyl carbinol was complete as evidenced by no further decrease in pressure.

TABLE II

Hydrogenation of alkyl phenyl ketones in the presence of a catalyst formed by reducing a mixture of 4% alumina and 96% copper oxide

| Alkyl group of alkyl phenyl ketone | Temperature at which hydrogenation began | Maximum pressure reached | Maximum rate of pressure drop | Minutes required for pressure to drop from maximum to constant | Time of heating from 80° C. to end of hydrogenation |
|---|---|---|---|---|---|
| | °C. | Atmospheres | Atms./minute | | |
| Methyl | 90 | 116.5 | 0.89 | 29 | 37 |
| Ethyl | 101 | 118.0 | 0.67 | 37 | 48 |
| Propyl | 110 | 122.5 | 0.10 | 286 | 311 |
| Normal butyl | 108 | 120.5 | 0.13 | 138 | 150 |
| Normal amyl | 92 | 117.5 | 0.67 | 25 | 36 |
| Normal heptyl | 94 | 116.0 | 0.75 | 19 | 29 |
| Normal nonyl | 86 | 115.5 | 1.0 | 14 | 19 |

The above indicated results show that methyl phenyl ketone (acetophenone), ethyl phenyl ketone, normal amyl phenyl ketone (caproyl phenone), and several phenyl ketones of higher alkyl chain length hydrogenate rapidly in the presence of reduced copper-alumina catalyst. Normal propyl phenyl ketone and normal butyl phenyl ketone were more difficult to hydrogenate but these conversions to the alkyl phenyl carbinols were effected after a longer time of heating at the reaction temperature as shown in Table II.

EXAMPLE III

A higher temperature than those shown in Examples I and II was required to hydrogenate alkyl phenyl ketones or the corresponding alkyl phenyl carbinols to alkyl benzenes. Thus, 50 parts by weight of normal propyl phenyl carbinol in 40 parts by weight of cyclohexane gave a 95% yield of normal butyl benzene when subjected to hydrogenation at 180° C. for 1 hour in the presence of a catalyst obtained by reducing a composite of 96% copper oxide and 4% alumina.

EXAMPLE IV

Under the hydrogenating conditions shown in Example III, a mixture of 100 parts by weight of normal dodecyl phenyl carbinol, 80 parts by weight of cyclohexane, and 7 parts by weight of copper-alumina catalyst gave a 91% yield of normal tri-decyl benzene, $n\text{-}C_{13}H_{27}C_6H_5$.

EXAMPLE V 75 parts by weight of normal heptyl phenyl ketone, 60 parts by weight of cyclohexane, and 10 parts by weight of the catalyst as employed in Example III were placed in an autoclave to which hydrogen was added to 100 atmospheres initial pressure. The resulting reaction mixture, after heating for 1 hour at 180° to 186° C., yielded normal octyl benzene.

EXAMPLE VI 75 parts by weight of laurophenone, 60 parts by weight of cyclohexane, and 10 parts by weight of catalyst as used in Examples III and V were placed in an autoclave to which hydrogen was added to 100 atmospheres pressure. Hydrogenation of this reaction mixture to normal dodecyl benzene occurred after heating for 16 minutes at 180° to 188° C. As indicated by the rate of increase of pressure with temperature, hydrogenation of the ketone (laurophenone) to the corresponding intermediate carbinol proceeded while the autoclave was being heated to the reaction temperature and was complete before a temperature of 180° C. was reached.

The character of the process of the present invention and particularly its commercial value are evident from the preceding specification and examples, although neither section is intended to limit its generally broad scope.

We claim as our invention:

1. A process for producing alkyl aryl compounds which comprises subjecting an alkyl aryl ketone to hydrogenation in the presence of a catalyst formed by subjecting to reduction a composite comprising essentially a major proportion of copper oxide and a relatively minor proportion of alumina.

2. A process for producing an alkylated aromatic hydrocarbon which comprises subjecting an alkyl aryl ketone to hydrogenation in the presence of a catalyst formed by subjecting to reduction a composite comprising essentially a major proportion of copper oxide and a relatively minor proportion of alumina.

3. A process for producing an alkylated aromatic hydrocarbon which comprises subjecting an alkyl aryl ketone and hydrogen to contact at a temperature between about 75° and about 250° C. in the presence of a catalyst formed by subjecting to reduction a composite comprising essentially a major proportion of copper oxide and a relatively minor proportion of alumina.

4. A process for producing an alkylated aromatic hydrocarbon which comprises subjecting an alkyl aryl ketone and hydrogen to contact at a temperature between about 75° and about 250° C. under a pressure of from about 50 to about 200 atmospheres in the presence of a catalyst formed by subjecting to reduction a composite comprising essentially a major proportion of copper oxide and a relatively minor proportion of alumina.

5. A process for producing an alkylated benzene hydrocarbon which comprises subjecting an alkyl phenyl ketone to hydrogenation in the presence of a catalyst formed by subjecting to reduction a composite comprising essentially a major proportion of copper oxide and a relatively minor proportion of alumina.

6. A process for producing an alkylated benzene hydrocarbon which comprises subjecting an alkyl phenyl ketone and hydrogen to contact at a temperature between about 75° and about 250° C. under a pressure of from about 50 to about 200 atmospheres in the presence of a catalyst formed by subjecting to reduction a composite comprising essentially a major proportion of copper oxide and a relatively minor proportion of alumina.

7. A process for producing a normal-alkyl benzene hydrocarbon which comprises subjecting to hydrogenation a normal alkyl phenyl ketone at a temperature between about 75° and about 250° C. under a pressure of from about 50 to about 200 atmospheres in the presence of a catalyst formed by subjecting to reduction a composite comprising essentially a major proportion of copper oxide and a relatively minor proportion of alumina.

8. A process for producing a normal-alkyl benzene hydrocarbon which comprises subjecting to hydrogenation at a temperature between about 75° and about 250° C. under a pressure of from about 50 to about 200 atmospheres a normal alkyl phenyl ketone having an alkyl group containing from 1 to about 20 carbon atoms in the presence of a catalyst formed by subjecting to reduction a composite comprising essentially a major proportion of copper oxide and a relatively minor proportion of alumina.

9. A process for producing normal octyl benzene which comprises subjecting normal heptyl phenyl ketone to hydrogenation at a temperature between about 75° and about 250° C. under a pressure of from about 50 to about 200 atmospheres in the presence of a catalyst formed by subjecting to reduction a composite comprising essentially a major proportion of copper oxide and a relatively minor proportion of alumina.

10. A process for producing normal dodecyl benzene which comprises subjecting laurophenone to hydrogenation at a temperature between about 75° and about 250° C. under a pressure of from about 50 to about 200 atmospheres in the presence of a catalyst formed by subjecting to reduction a composite comprising essentially a major proportion of copper oxide and a relatively minor proportion of alumina.

VLADIMIR N. IPATIEFF.
VLADIMIR HAENSEL.